US005771204A

United States Patent [19]
Froggatt

[11] Patent Number: 5,771,204
[45] Date of Patent: *Jun. 23, 1998

[54] APPARATUS AND METHOD FOR MEASURING RELATIVE PHASE OF SIGNALS IN A MULTIPLE-ECHO SYSTEM

[75] Inventor: Mark E. Froggatt, Yorktown, Va.

[73] Assignee: The United States of America as represented by the Administrator of the National Aeronautics and Space Administration, Washington, D.C.

[21] Appl. No.: 754,642

[22] Filed: Nov. 21, 1996

Related U.S. Application Data

[60] Provisional application No. 60/022,523, Jul. 18, 1996.
[51] Int. Cl.$^6$ .................................................. G01S 15/00
[52] U.S. Cl. ................................................................ 367/97
[58] Field of Search ................................. 367/13, 87, 97, 367/99, 123, 125, 135; 73/1.08, 597

[56] References Cited

U.S. PATENT DOCUMENTS

| | | | |
|---|---|---|---|
| 4,363,242 | 12/1982 | Heyman | 73/761 |
| 4,624,142 | 11/1986 | Heyman | 367/99 |
| 4,833,460 | 5/1989 | Sabo | 346/658 |
| 5,404,743 | 4/1995 | Froggatt | 73/1.08 |

OTHER PUBLICATIONS

M.e. Froggatt et al., "Interrupted ultrasonic bolt load measurements using the pulsed phase–locked loop system", IEEE Transactions on Instrumentation and Measurement, vol. 45, No. 1, Feb. 1996, pp. 112–116

M. E. Froggatt et al, "Pulsed phase–locked loop calibration over frequency", IEE Transaction on Instrumentation and Measurement, vol. 45, No. 1, Feb. 1996, pp. 123–126.

*Primary Examiner*—Daniel T. Pihulic
*Attorney, Agent, or Firm*—Robin W. Edwards

[57] ABSTRACT

An apparatus and method for measuring the relative phase of echo signals in a multiple-echo system. A signal generator generates an exciting tone burst and subsequent tone bursts delayed in phase from the exciting tone burst. The exciting tone burst is gated into a transducer coupled to the multiple-echo system. Each subsequent tone burst is converted into a series of pulses. Each pulse triggers a sample/hold circuit to sample each echo signal. The samples of the echo signal are averaged and then compared to a reference value. The signal generator is controlled to vary the subsequent tone burst phase delay to determine for each echo signal a subsequent tone burst phase delay that causes the average of the samples of the echo signal to be substantially equal to the reference value wherein the determined subsequent tone burst phase delay is the phase delay of the echo signal with respect to the exciting tone burst. The control circuit then determines the difference in phase delay between echo signals to determine the relative phase delay of the echo signals.

26 Claims, 4 Drawing Sheets

APPARATUS AND METHOD FOR MEASURING RELATIVE PHASE OF SIGNALS IN A MULTIPLE-ECHO SYSTEM

The invention described herein was made by an employee of the United States Government and may be used by or for the Government for governmental purposes without the payment of any royalties thereon or therefor.

This application claims the benefit of U.S. Provisional application Ser. No. 60/022,523 filed on Jul. 18, 1996.

BACKGROUND OF THE INVENTION

1. Field of the Invention

The present invention is generally related to an apparatus and method for measuring the relative phase of echo signals in a multiple-echo system.

2. Description of the Related Art

A multiple-echo system or multiple-echo sample comprises many signal paths that produce signals that are echoes of a signal burst inputted into the multiple-echo system. Such multiple-echo systems are also referred to as multiple-signal path systems. Each echo signal can be delayed by different amounts as a result of differences in signal path length, propagation velocity or both. It is often necessary to measure the relative phase delay of echo signals in order to determine the difference in lengths or propagation velocities of the respective signal paths that produced the echo signals.

The need to measure relative phase delay typically arises in ultrasonic applications where it is sometimes necessary to measure ultrasonic lengths. One example is the measurement of the ultrasonic length of a bolt as it is tightened. Another example is the measurement of the thickness of a sample when part of the transmission is through an unstable medium such as turbulent water. There is also a need to effect relative phase delay measurements of ultrasonic lengths in biomedical applications. For example, it may be necessary to measure the thickness of the wall of the human heart while it is beating. In another example, it may be necessary to measure ultrasonic length when measuring intracranial pressure.

Conventional devices used to measure relative phase delay of echo signals typically utilize analog phase shifters to effect shifting the phase of reference signals that are used in phase comparator circuitry. However, analog phase shifting significantly restricts the available range of phase shift, typically less than 360°. Furthermore, analog phase shifters require careful calibration which is a time consuming process. Additionally, conventional devices for measuring relative phase delay require significantly more circuitry in order to measure relative phase delay of more than two echo locations. As a result, the circuitry of such conventional devices is complex and consumes a relative high amount of power. Additionally, such conventional devices are costly to manufacture and repair.

It is therefore an object of the present invention to provide a new and improved apparatus and method for measuring relative phase delay of echo signals in a multiple-echo system.

It is another object of the present invention to provide a new and improved apparatus and method for measuring relative phase delay of more than two (2) echo signals in a multiple-echo system.

It is another object of the present invention to provide a new and improved apparatus and method for measuring relative phase delay of echo signals in a multiple echo system with a relatively high degree of accuracy.

It is a further object of the present invention to provide a new and improved apparatus and method for measuring relative phase delay of echo signals in a multiple echo system that uses relatively fewer components than conventional devices.

It is yet another object of the present invention to provide a new and improved apparatus for measuring relative phase delay of echo signals in a multiple echo system and that costs less to manufacture than conventional phase measurement devices.

It is a further object of the present invention to provide a new and improved apparatus for measuring relative phase delay of echo signals in a multiple echo system in relatively less time than conventional devices.

Still other objects and advantages of the present invention will in part be obvious and will in part be apparent from the specification.

SUMMARY OF THE INVENTION

The above and other objects and advantages, which will be apparent to one of skill in the art, are achieved in the present invention which is directed to an apparatus and method for measuring the relative phase of echo signals in a multiple-echo system. A signal generator generates an exciting tone burst and subsequent tone bursts delayed in phase from the exciting tone burst. The exciting tone burst is gated into a transducer coupled to the multiple-echo system. Each subsequent tone burst is converted into a series of pulses. Each pulse triggers a sample/hold circuit to sample each echo signal. The samples of the echo signal are averaged and then compared to a reference value. The signal generator is controlled to vary the phase delay of the subsequent tone bursts until the average of the samples of each echo signal is substantially equal to the reference value. Varying the phase delay in this manner results in the determination, for each echo signal, of a particular phase delay of the subsequent tone burst that causes the average of samples of the echo signal to be substantially equal to the reference value. The determined phase delay constitutes the phase delay of the echo signal with respect to the exciting tone burst. The control circuit then determines the difference in phase delay between echo signals to determine the relative phase delay of the echo signals.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiments of the present invention, reference will be made herein to FIGS. 1–5 of the drawings in which like numerals refer to like features of the invention.

Figure 1:
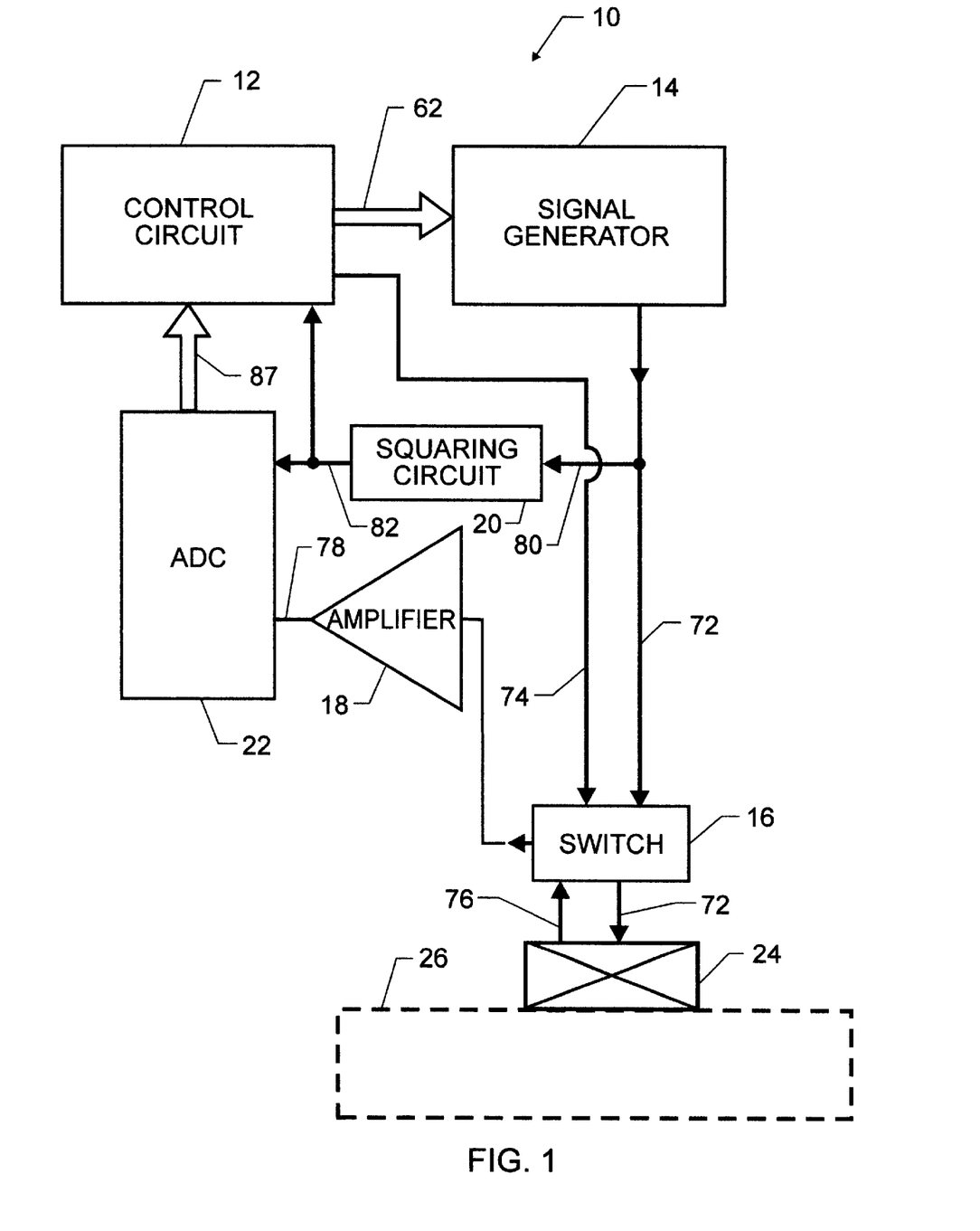
FIG. 1 is a block diagram of the relative phase delay measurement apparatus of the present invention.

Referring to FIG. 1, relative phase delay measurement system 10 of the present invention is shown. System 10 comprises signal generator control circuit 12, signal generator 14, switch 16, amplifier 18, squaring circuit 20, analog-to-digital converter (ADC) 22 and transducer 24. Transducer 24 is attached or coupled to the multiple echo system 26 (or multiple signal path system). Transducer 24 converts electrical signals into acoustic signals in the multiple echo system and converts acoustic echo signals received from each signal path or echo location in system 26 into electrical signals.

As will be explained in detail below, system 10 generates an exciting tone burst that is inputted into transducer 24. System 10 then generates subsequent tone bursts that are used to locate the received echo signals. This is accomplished by varying the phase delay of the subsequent tone bursts.

Figure 2:
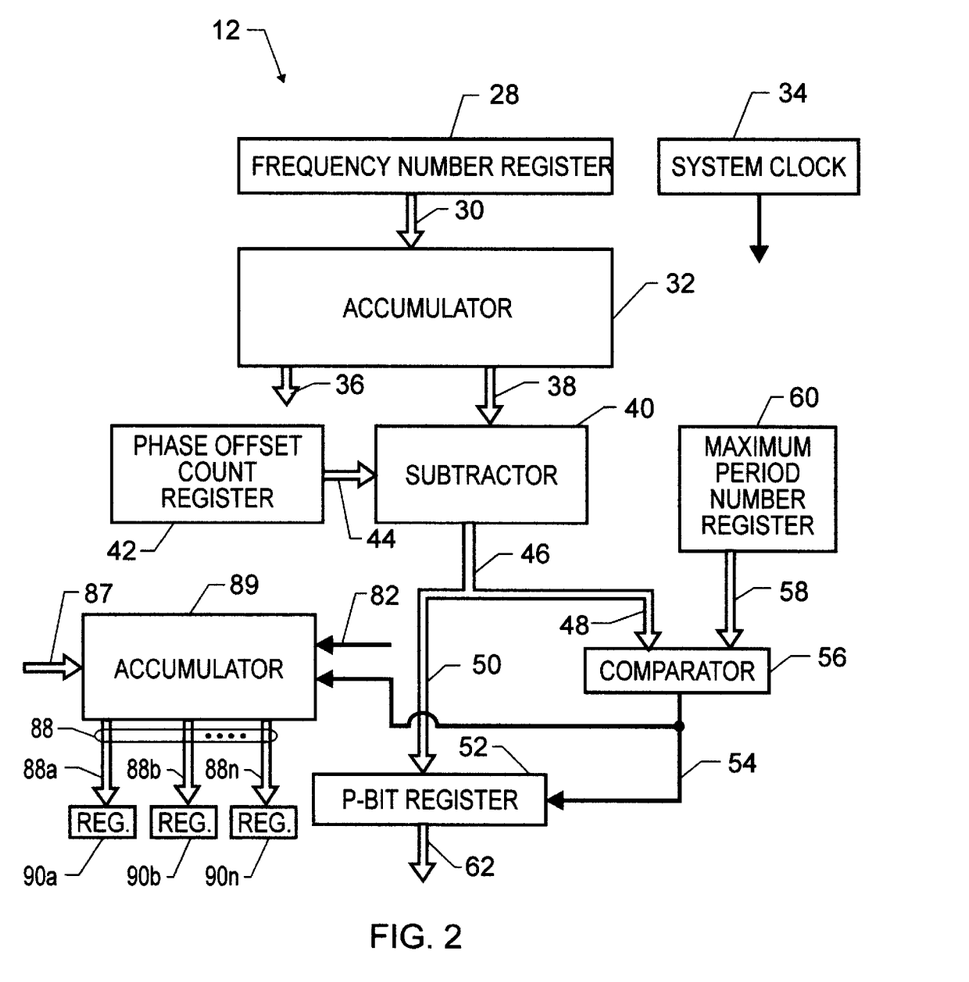
FIG. 2 is a block diagram of a signal generator control circuit shown in FIG. 1.

Referring to FIG. 2, signal generator control circuit 12 is shown in detail. Frequency number register 28 stores multi-bit frequency number 30 that represents the rate at which the phase changes and thus, the frequency of the exciting tone burst and all subsequent tone bursts. This is referred to as the operating frequency. Signal 30 is inputted into accumulator 32 and becomes the initial accumulator value. Accumulator 32 determines the phase of the tone bursts. A computer (not shown) resets accumulator 32 in order to initiate the entire sequence of steps described below. Preferably, the size of accumulator 32 is between 24 and 34 bits. In a preferred embodiment, the frequencies of the exciting tone burst and the subsequent tone burst are the same. However, in an alternate embodiment of the present invention, which is discussed in detail below, frequency number 30 is variable.

System clock 34 is inputted into accumulator 32 and increments the accumulator value by the frequency number every clock pulse. Accumulator 32 outputs multi-bit signals 36 and 38 on every clock pulse. Signal 36 comprises the least significant bits (LSBs) of the accumulator value and is referred to as the frequency enhancing bits. The frequency enhancing bits are used to increase the frequency resolution of the system. Signal 38 comprises the most significant bits (MSBs) of the accumulative value and is inputted into subtractor circuit 40. Phase offset count register 42 contains phase offset count 44 that is provided by the computer (not shown) and is inputted into subtractor circuit 40. Phase offset count 44 represents a predetermined phase delay.

Phase offset count 44 is subtracted from multi-bit signal 38 on each clock pulse of system clock 34. When system 10 is powered up, i.e. initial conditions, the contents of accumulator 32 and phase offset count 44 are zero. Thus, the exciting tone burst, which is the first tone burst, is the reference phase. Subtractor circuit 40 subtracts phase offset count 44 from signal 38 to produce a current adjusted phase number 46.

Referring to FIGS. 1 and 2, current adjusted phase number 46 is comprised of a most significant group of bits that represent period number 48, and a least significant group of bits that represents fractional phase number 50. The number of bits allocated to period number 48 and fractional phase number 50 is determined by the system requirements, i.e. the required resolution, range, accuracy and processing speed.

The input bits of accumulator 32 corresponding to period number 48 are tied to a logic low or "0" and are not used to determine the operating frequency. Period number 48 represents the number of periods of the operating frequency that have occurred since the beginning of an exciting tone burst. Thus, period number 48 acts as a counter that counts the number of times that the phase of a tone burst cycles through 360°. Period number 48 determines the maximum phase delay that can be measured by system 10 which is represented by the formula:

$$\varnothing_{MAX} = \Pi 2^K,$$

wherein K is the largest number of bits defining period number 48. If the value represented by phase offset count 44 is greater than the value represented by signal 38, the subtraction operation yields a negative number. Negative numbers are mapped to a large, positive number. Thus, when the subtraction operation of subtractor 40 produces a negative number, such negative number is mapped to a large, positive number. Therefore, period number 48 also becomes a large, positive number. The significance of this feature will be discussed in detail below.

The least significant group of bits of signal 46 represents fractional phase number 50. Fractional phase number 50 comprises P-bits which define a fraction of a period by which a tone burst may be delayed. For example, fractional phase number 50 may represent 0°, 45°, 90°, 180°, 135°, 180°, 270° or some other fraction of a 360° period or cycle. The P-bits that determine fractional phase number 50 determine the minimum phase step which is represented by:

$$\varnothing_{STEP} = \Pi/2^{P-1}.$$

Fractional phase number 50 is inputted into register 52. Register 52 is enabled or disabled by bi-state control 54 that is outputted by comparator 56. Control signal 54 has first and second states that enable and disable, respectively, register 52. Comparator 56 receives period number 48 and a predetermined maximum period number 58. Maximum period number 58 is represented by a multi-bit signal that is outputted by register 60 on every clock pulse of system clock 34. The computer (not shown) loads maximum period number 58 into register 60. Maximum period number 58 is the maximum number of periods or cycles of the frequency in a tone burst and therefore determines the width of the tone burst. If comparator 56 determines that period number 48 is less than maximum period number 58, comparator 56 outputs control signal 54 with a first state to enable register 52 to transfer P-bit fractional phase number 50 to signal generator 14. When period number 48 becomes greater than maximum period number 58, comparator 56 outputs control signal 54 with a second state to disable register 52 thereby inhibiting transfer of fractional phase number 50. When register 52 is disabled, P-bit output 62 signal is zero.

Figure 3:
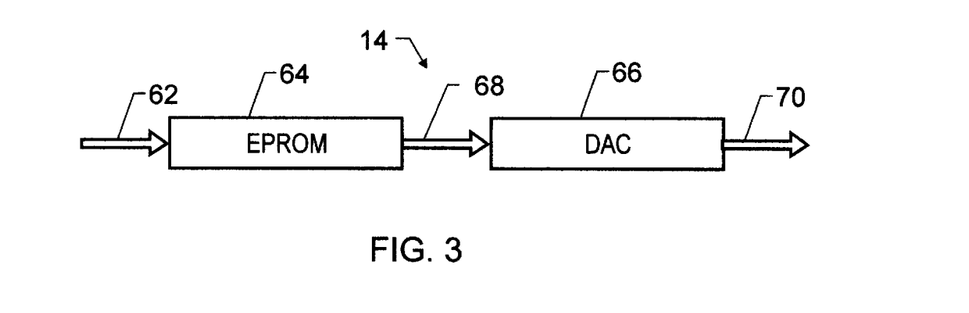
FIG. 3 is a block diagram of a signal generator shown in FIG. 1.

Referring to FIG. 3, signal generator 14 comprises memory device 64 and DAC (digital-to-analog converter) 66. In a preferred embodiment, memory device 66 is an EPROM (eraseable programmable read-only-memory). EPROM 64 contains a P-bit look-up table that is used to produce a synthesized sine wave. Each fractional phase number 50, upon receipt of a system clock pulse, is mapped to a corresponding amplitude value of a sine wave that is stored in the look-up table. EPROM 64 outputs multi-bit signal 68 that represents the sine of fractional phase number 50. For example, if fractional phase 50 represents 90°, then EPROM 64 outputs multi-bit signal 68 representing sin (90°). Signal 68 is inputted into DAC (digital-to-analog converter) 66. On every clock pulse of system clock 34, DAC 66 outputs signal 70 representing the analog representation of signal 68. Preferably, the phase step size, i.e. 22.5°, 45°, 90°, etc., matches the phase resolution determined by the effective bits in DAC 66. Thus, control circuit 12 and signal generator 14 cooperate to digitally synthesize a sinusoidal waveform 70 until a tone burst having the maximum number of periods or cycles of the system frequency is produced. As described above, the maximum number of periods or cycles of the system frequency in the tone burst is defined by predetermined maximum period number 58.

When period number 48 is greater than the number stored in register 60, comparator 56 disables register 52 which causes its P-bit 62 output to become zero. This zero-value signal 62 is inputted into EPROM 64. EPROM 64 determines, via its look-up table, that sin(O) is zero. Thus, EPROM 64 outputs multi-bit signal 68 representing zero. When DAC 66 receives a zero-value multi-bit signal 68, DAC 66 outputs zero volts. This represents the d.c. (direct current) voltage level between tone bursts. DAC 66 may be configured to output a voltage level other than zero when it receives a zero-value multi-bit signal 68.

Upon the first clock cycle after comparator 56 indicates period number 48 is greater than maximum period number 58, control circuit 12 loads a new phase-offset count value 44 into register 42. Any number of values can be sequentially loaded into register 42 and thus, any number of tone bursts can be produced. Once phase-offset count 44 is incremented, output signal 38 becomes less than the phase offset count 44. Thus, the resulting difference produced by subtractor 40 is a negative number. As described above, this negative number is mapped to a relatively large, positive number which becomes multi-bit 46. As a result, period number 48 (the MSBs of signal 46) is significantly greater than maximum period number 58. EPROM 64 then outputs multi-bit signal 68 representing sin(O) and DAC 66 outputs a zero-volt level. Period number 48 remains greater than the maximum period number 58 until output signal 38 of accumulator 32 becomes greater than the value of phase offset count 44. The time that elapses between the moment period number 48 becomes greater than the maximum period number 58 and the moment period number 48 first becomes less than maximum period number 58 is substantially equal to the time between tone bursts.

Figure 4:
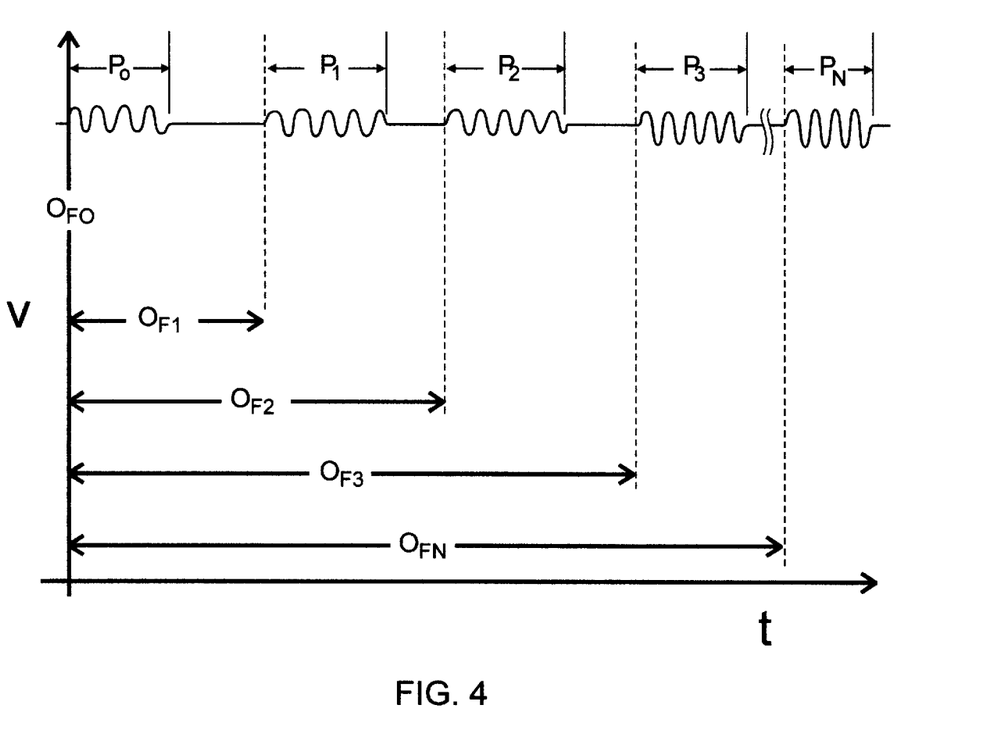
FIG. 4 is a timing diagram illustrating the timing relationship of the phase offsets of the signals produced by the relative phase measurement system shown in FIG. 1.

If it is desired to measure the location of N echoes, then phase offset count register 42 will have N values stored therein. As shown in FIG. 4, these values are represented by $O_{F1}$, $O_{F2}$, $O_{F3}$ ... $O_{FN}$. The location of the exciting tone burst is represented by $O_{OF}$ and is always zero. As described in detail below, immediately after register 52 is disabled, $O_{F1}$ is loaded into phase offset count register 42. Accumulator 32 is not reset at this time, however, its value is known and is approximately $O_{OF}+P_O$ wherein $P_O$ is the width of the transmitted tone burst. Each of the remaining designations $P_1, P_2, P_3, \ldots P_N$ represent the width of a corresponding tone burst. $O_{F1}$, will be constrained to be greater than $O_{OF}+P_O$ thereby forcing the subtraction function of subtractor 40 to produce a negative result. This constraint on $O_{F1}$ means that two tone bursts cannot be simultaneously produced. All the phase offset values are constrained as follows: $O_{OF}<O_{F1}<O_{F2}<O_{F3}< \ldots <O_{FN}$. Thus, second tone burst cannot be produced before the first tone burst, the third tone burst cannot be produced before the second tone burst, etc. As a result of these constraints, when register 52 is disabled, the subtraction function of subtractor 40 produces a negative result. This negative result is mapped to a relatively large number as described above.

Figure 5:
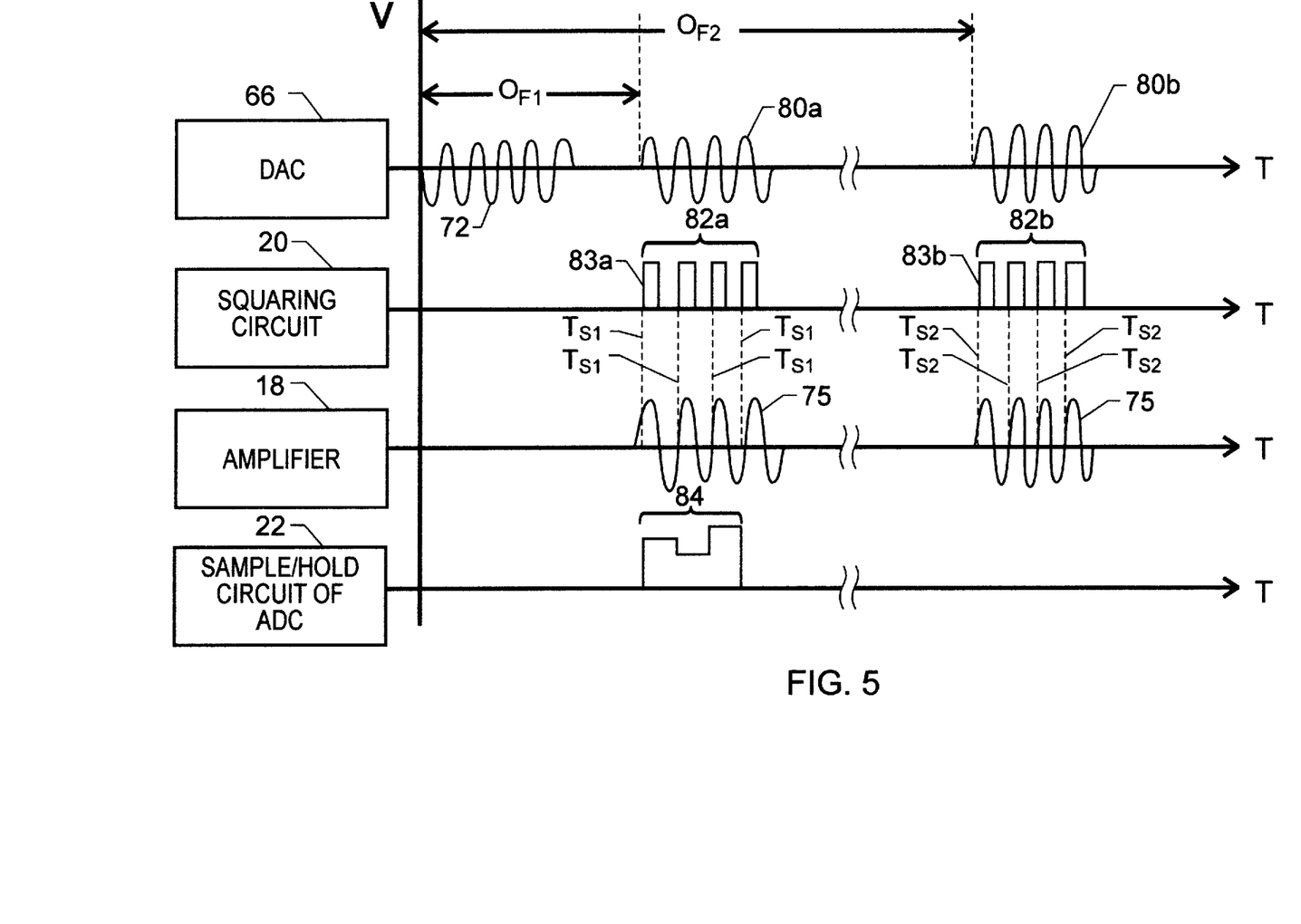
FIG. 5 is a timing diagram illustrating the timing relationship of the signals produced by the relative phase measurement system shown in FIG. 1 and echo signals received from a multiple echo system.

Referring to the voltage-versus-time graph of FIG. 5, control circuit 12 and signal generator 14 cooperate to produce first an exciting tone burst 72 in the manner described above. When exciting tone burst 72 is produced, phase offset count 44 is set to zero and represents the reference phase. Exciting tone burst 72 is inputted into switch 16 (see FIG. 1). Control circuit 12 outputs control signal 74 which enables switch 16 to gate exciting tone burst 72 into transducer 24. Transducer 24 converts exciting tone burst 72 into an acoustic signal that is inputted into multiple-echo system 26. Transducer 24 receives echoes 75 of exciting tone burst 72 and converts these echoes into electrical signals. These electrical echo signals are then outputted to switch 16 via signal path 76. Switch 16 couples the echo signals to the input of amplifier 18 which amplifies the echo signals. In a preferred embodiment, switch 16 is a high-isolation analog switch. The amplified echo signals are inputted into the signal input 78 of ADC 22.

Referring again to FIG. 5, after exciting tone burst 72 is produced, control circuit 12 and signal generator 14 cooperate to generate subsequent tone burst 80a. Preferably, the width of exciting tone burst 72 is greater than the width of each subsequent tone burst 80a. In a preferred embodiment, the width of exciting tone burst 72 is 20% greater than the width of all subsequent tone bursts. Referring to FIGS. 1 and 5, subsequent tone bursts 80a is inputted into squaring circuit 20 which converts subsequent tone burst 80a into a series of TTL (transistor-transistor-logic) or CMOS (complementary metal oxide semiconductor) level pulses 82a. These pulses are also referred to generally as signal 80 in FIG. 1. In a preferred embodiment, squaring circuit 20 is a Schmidtt-trigger logic device. The precise location of the edges of each pulse 82a is determined by the phase offset $O_{F1}$ of subsequent tone burst 80a. The temporal resolution is represented by:

$$T_{RES}=1/(\Pi F2^n)$$

wherein F is the system operating frequency as determined by frequency number 30 stored in register 28 and system clock 34, and n is the number of effective bits of DAC 66. Pulses 82a trigger the sample/hold circuitry in ADC 22 to effect sampling of echo signal 75. Either the leading or trailing edge of pulses 82a can be used to trigger the sample/hold circuitry of ADC 22. Thus, echo signal 75 is precisely sampled at times $T_{S1}$ determined by either leading or trailing edges of pulses 82. For purposes of describing the present invention, FIG. 5 shows echo signals 75 being sampled on the leading edges 83a of pulses 82a. The sample/hold circuit of ADC 22 outputs waveform 84. The other circuitry of ADC 22 then converts waveform 84 into multi-bit signal 87 which is inputted into accumulator 89.

As shown in FIGS. 1 and 2, control signal 54 and the output pulses 82 of squaring circuit 20 are also inputted into accumulator 89. Pulses 82 act as a clock to synchronize the input and output of digital signals 87 and 88a–n, respectively. To simplify the ensuing discussion, signals 88a–n are also referred to generally as signal 88. When control signal 54 disables register 52, accumulator 89 outputs signals 88a–n that represent the summation of the echo-signal samples produced by each subsequent tone burst. Signals 88a–n are inputted into registers 90a–n, respectively, wherein register 90n stores the summation of samples of the Nth echo signal. Accumulator 89 is then reset to zero. For example, if one subsequent tone burst produces samples $S_{1-5}$, accumulator 89 outputs the summation of these samples $(S_1+S_2+S_4+S_5)$ to register 90a when register 52 is disabled. Similarly, if another subsequent tone burst produces samples $S_{6-10}$, accumulator 89 outputs the summation of these samples ($S_6+S_7+S_8+S_9S_{10}$) to register 90*b* when register 52 is disabled. Finally, the summation of samples produced by the last subsequent tone burst is outputted to register 90n when register 52 disabled. After all subsequent tone bursts have been produced, the computer reads summation values 88*a–n* stored in registers 90*a–n*, respectively. Summation values 88*a–n* constitute the average of the samples of each echo signal.

The computer then determines if the average values 88*a–n* stored in registers 90*a–n*, respectively, are equal to a predetermined or reference value. In a preferred embodiment, the reference value is substantially zero. The reference value is substantially equal to the d.c. offset of the echo signals 75. Thus, in a preferred embodiment, echo signals 75 have a zero offset voltage. If the computer determines that average values 88*a–n* are not equal to zero, the computer adjusts or increments the values stored in phase offset count register 42.

Since phase offset count 44 stored in register 42 has been incremented, period number 48 now has a value that produces a subsequent tone burst 80*b* that is offset or delayed in phase from exciting tone burst 72 by $O_{F2}$. $O_{F2}$ represents a number of periods (or phase delay) that is greater than the previous number of periods $O_{F1}$. For example and referring to FIG. 5, the previous phase offset or phase delay is represented by $O_{F1}$ and the current, larger phase delay is represented by $O_{F2}$. Thus, the phase delay or phase offset of the subsequent tone bursts is increased by $\Delta O_F$ which is the difference between $O_{F1}$ and $O_{F2}$. As shown in FIG. 5, $O_{F1}$ and $O_{F2}$ are measured between the start of exciting tone burst 72 and the subsequent tone burst. Referring to FIGS. 1 and 5, subsequent tone burst 80*b* produced at the end of offset $O_{F2}$ is inputted into squaring circuit 20 and converted, as described above, into a series of TTL or CMOS pulses 82*b*. Since subsequent tone bursts 80*b* are offset by $O_{F2}$, leading edges 83*b* are shifted in time. As a result, ADC 22 now samples echo signal 75 at different points in time, $T_{S2}$.

The steps described above are repeated until a phase offset or phase delay is produced that shifts the pulses outputted by circuit 20 (pulses 82*a* or 82*b*) in time such that the zero-crossings of the amplified echo signal at ADC input 78 and the zero-crossings of pulses outputted from circuit 20 are substantially aligned. For example and referring to FIG. 5, ADC 22 is configured so that it samples the amplified echo signal 75 on the leading edge 83*b* of each pulse 82*b*. Adjusting the phase delay of $O_{F2}$ has resulted in the zero-crossings of echo signal 75 and pulses 82b being substantially aligned. As a result of this alignment, ADC 22 samples echo signal 75 at the points of the echo signal that have substantially zero amplitude. Therefore, each sample of echo signal 75 will have a zero value. Accumulator 89 therefore will determine the average (or summation) of the samples to be zero. As a result, the computer now determines that average value 88 is equal to the reference value (which is zero in this case). The computer then stores the current phase offset value (which is now $O_{F2}$) and assigns it to the particular sampled echo signal which originated from a specific signal path or echo location in the multiple-echo system. The process described above is performed on each offset $O_{FN}$ until a tone burst phase delay is determined for each echo signal of each echo location or signal path in the multiple-echo system wherein such particular offset phase delay causes the average of samples of the echo signal to be substantially equal to the reference value. The determined subsequent tone burst phase delay constitutes the phase delay of the echo signal with respect to the exciting tone burst.

As described above, the average of the samples of the echo signal is substantially equal to the reference value, e.g. zero, when the zero-crossings of that particular echo signal are substantially aligned with the zero-crossings of the leading (or trailing) edges of the pulses outputted from circuit 20. When a phase delay or phase offset is determined for each echo signal, the relative phase offset between any pair of echo signals may be determined. The difference in phase delay or phase offset between a pair of echo signals yields a precise measurement of the phase difference between the echo signals. This phase difference has an accuracy represented by:

$$\Delta\phi=1/(\Pi 2^{n-1}) \text{ radians}.$$

wherein n is the number of effective bits of DAC 66.

In an alternate embodiment, system 10 of the present invention may be modified to measure repetitive Doppler shifts that may occur in any cyclic system. In such a cyclic system, the frequency of the return echoes are slightly different then the frequency of transmitted exciting tone burst 72. To effect measurements of Doppler shifts, system 10 is configured so that when phase offset count 44 stored in register 42 is adjusted, the frequency number in register 28 is adjusted as well so as to adjust the frequency of the subsequent tone bursts. The frequency of the subsequent tone bursts is varied until the zero-crossings of the echo signals and the series of pulses (see pulses 82*a* or 82*b* in FIG. 5) are aligned. When the zero crossings of these signals are aligned, the frequencies of the subsequent tone bursts and the echo signal are the same. The difference between the first and last sampled voltage of the echo signal is used a feedback signal to adjust the frequency of the subsequent tone bursts.

In a further embodiment, system 10 is modified to measure nonlinearities that create harmonics in the echo signals. This is accomplished by measuring the amplitude of the echo signals as a function of phase through 360° and then taking a FFT (Fast Fourier Transform) of the series of harmonics. The first sixteen (16) harmonics can be measured with a sixteen (16) point Fast Fourier Transform of sixteen (16) voltage measurements every $\Pi/8$ radians.

System 10 may be operated in a display mode in which the number of cycles of the subsequent tone burst is set to one (1) and the phase offset count is incremented at regular intervals as the result of the analog-to-digital conversion is monitored. Such a configuration would result in a voltage-versus-time (or phase at a particular frequency) display of the received echo signal. Thus, echo signals can be located and inspected with no additional equipment or circuitry.

System 10 can be fabricated on a single printed circuit board and either installed directly into a computer or connected to a computer through an external port. Only a single BNC connector would be needed on the card or external box in addition to the computer interface.

Commercially available programmable logic chips can allow relative phase measurements of as many as four (4) echo signals. Furthermore, commercially available high-accuracy and high-stability clocks and DACs can effect precise phase measurements. As a result of the reduction in hardware complexity, system 10 of the present invention is smaller in size than conventional phase measurement systems. Furthermore, system 10 of the present invention consumes less power and costs less than conventional phase measurement devices.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for measuring the relative phase of echo signals in a multiple-echo system, comprising:

a signal generator generating an exciting tone burst and subsequent tone bursts delayed in phase from the exciting tone burst, the exciting tone burst driving a transducer coupled to the multiple-echo system;

a circuit for converting the subsequent tone bursts into a series of pulses;

a sample/hold circuit triggered by each pulse of the series of pulses to sample echo signals received through the transducer; and a control circuit for (1) averaging the samples, (2) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst, and (3) determining the difference in phase delays between echo signals to determine the relative phase delay of the echo signals.

2. The apparatus according to claim 1 further comprising a switch for gating the exciting tone burst to the transducer.

3. The apparatus according to claim 1 further comprising an amplifier for amplifying the echo signals.

4. The apparatus according to claim 1 wherein the sample/hold circuit comprises an analog-to-digital converter having a trigger input receiving the series of pulses and a signal input receiving the echo signals.

5. The apparatus according to claim 1 wherein the sample/hold circuit is configured to sample the echo signals on the leading edge of each pulse in the series of pulses and the control circuit varies the phase delay of the subsequent tone bursts until the zero-crossings of the leading edge of each pulse of the series of pulses are substantially aligned with the zero-crossings of a particular echo signal.

6. The apparatus according to claim 1 wherein the sample/hold circuit is configured to sample the echo signals on the trailing edge of each pulse in the series of pulses and the control circuit varies the phase delay of the subsequent tone bursts until the zero-crossings of the trailing edge of each pulse of the series of pulses are substantially aligned with the zero-crossings of a particular echo signal.

7. The apparatus according to claim 1 wherein the signal generator comprises a digital frequency synthesizer.

8. The apparatus according to claim 1 wherein the generator comprises circuitry for varying the frequency and phase delay of the subsequent tone bursts, and the control circuit controls the signal generator to vary the frequency and phase delay of the subsequent tone burst until the averaged samples of each echo signal are substantially equal to the reference value, the frequency of the subsequent tone burst substantially matching the frequency of a particular echo signal when the average of the samples of that echo signal are substantially equal to the reference value.

9. The apparatus according to claim 1 further comprising additional circuitry for sampling each echo signal as a function of its phase, and performing a Fast Fourier Transform on the samples to measure nonlinearities that produce harmonics in that particular echo signal.

10. An apparatus for measuring the relative phase of echo signals in a multiple-echo system, comprising:

a digital frequency synthesizer for generating an exciting tone burst and subsequent tone bursts delayed in phase from the exciting tone burst;

a transducer for converting the exciting tone burst into an acoustic signal and coupling the acoustic signal to the multiple-echo system, and converting each acoustic echo signal of each echo path into a received electrical echo signal;

a switch for gating the exciting tone burst to the transducer and for receiving the echo signals from the transducer;

an amplifier for amplifying the echo signals received from the switch;

a circuit for converting subsequent tone bursts into a series of pulses;

an analog-to-digital converter triggered by each pulse of the series of pulses to sample each amplified echo signal; and a control circuit for (1) averaging the samples, (2) comparing the average to a reference value, (3) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst, and (4) determining the difference in phase delay between echo signals to determine the relative phase delay of the echo signals.

11. An apparatus for measuring the relative phase of echo signals in a multiple-echo system, comprising:

means for generating an exciting tone burst and subsequent tone bursts delayed in phase from the exciting tone burst;

means for converting the exciting tone burst into an acoustic signal and coupling the acoustic signal to the multiple-echo system, and converting each acoustic echo signal of each echo path into a received electrical echo signal;

means for converting each subsequent tone burst into a series of pulses;

means for sampling echo signals, the sampling means being triggered by an edge of each pulse of the series of pulses; and means for (1) averaging the samples, (2) comparing the average to a reference value, (3) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst, and (4) determining the difference in phase delay between echo signals to determine the relative phase delay of the echo signals.

12. A method of measuring relative phase of echo signals in a multiple-echo system, comprising the steps of:

(a) generating (1) an exciting tone burst for input into a transducer coupled to the multiple-echo system and (2) subsequent tone bursts delayed in phase from the exciting tone burst;

(b) converting each subsequent tone burst into a series of pulses;

(c) sampling echo signals received from the transducer according to sampling times determined by an edge of each pulse in the series of pulses;

(d) averaging the samples of each echo signal;

(e) comparing the average of the samples to a predetermined value;

(f) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst; and (g) determining the difference in phase delay between echo signals to determine the relative phase delay of the echo signals.

13. The method according to claim 12 wherein generating step (a) includes the step of gating the exciting tone burst to the transducer.

14. The method according to claim 12 further comprising the step of amplifying the echo signals prior to sampling step (c).

15. The method according to claim 12 wherein sampling step (c) comprises sampling the echo signals on the leading edge of each pulse in the series of pulses.

16. The method according to claim 12 wherein sampling step (c) comprises sampling the echo signals on the trailing edge of each pulse in the series of pulses.

17. The method according to claim 15 wherein controlling step (f) comprises the step of controlling the signal generator to vary the phase delay of the subsequent tone burst until the zero crossings of the leading edges of each pulse in the series of pulses are substantially aligned with the zero-crossings of a particular echo signal.

18. The method according to claim 16 wherein controlling step (f) comprises the step of controlling the signal generator to vary the phase delay of the subsequent tone burst until the zero crossings of the trailing edges of each pulse in the series of pulses are substantially aligned with the zero crossings of a particular echo signal.

19. The method according to claim 12 further comprising the step of storing the phase delay echo signal.

20. The method according to claim 12 further comprising the step of varying the frequency of the subsequent tone bursts until the average of the samples of each echo signal is substantially equal to the reference value, the frequency of the subsequent tone burst being substantially equal to the frequency of a particular echo signal when the average of the samples of that echo signal are substantially equal to the reference value.

21. The method according to claim 20 wherein the varying step comprises varying the frequency of the subsequent tone burst until the zero-crossings of an edge of each pulse in the series of pulses are substantially aligned with the zero-crossings of the particular echo signal.

22. The method according to claim 12 further comprising the steps of:

sampling each echo signal as a function of the phase of that echo signal; and performing a Fast Fourier Transform of the samples of the echo signal to measure nonlinearities that produce harmonics in the particular echo signal.

23. A method of measuring relative phase of echo signals in a multiple-echo system, comprising the steps of:

(a) generating (1) an exciting tone burst for input into a transducer coupled to the multiple-echo system and (2) subsequent tone bursts delayed in phase from the exciting tone burst;

(b) gating the exciting tone burst to the transducer;

(c) converting each subsequent tone burst into a series of pulses;

(d) amplifying the echo signals received from the transducer;

(e) sampling the amplified echo signals according to sampling times determined by an edge of each pulse in the series of pulses;

(f) averaging the samples of each echo signal;

(g) comparing the average of the samples to a reference value;

(h) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst;

(i) storing the phase delay of each echo signal; and (j) determining the difference in phase delay between echo signals to determine the relative phase delay of the echo signals.

24. A method of measuring relative phase of echo signals in a multiple-echo system using a relative phase measurement system having a signal generator for generating an exciting tone burst and subsequent tone bursts delayed in phase from the exciting tone burst, a transducer for converting the exciting tone burst into an acoustic signal and coupling the acoustic signal to the multiple-echo system and converting each acoustic echo signal of each echo path into a received electrical echo signal, a squaring circuit for converting each subsequent tone burst into a series of pulses, a sample/hold circuit triggered by each pulse of the series of pulses to sample each received echo signal, and a control circuit for (1) averaging the samples, (2) comparing the average to a reference value, (3) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst, (4) determining the difference in phase delay between echo signals to determine the relative phase delay of the echo signals, the method comprising the steps of:

(a) generating (1) an exciting tone burst for input into the transducer and (2) subsequent tone bursts delayed in phase from the exciting tone burst;

(b) converting each subsequent tone burst into a series of pulses;

(c) sampling echo signals received from the transducer according to sampling times determined by an edge of each pulse in the series of pulses;

(d) averaging the samples of each echo signal;

(e) comparing the average of the samples to a predetermined value;

(f) controlling the generator to vary the subsequent tone burst phase delay to determine for each echo signal a subsequent tone burst phase delay that causes the average of the samples of the echo signal to be substantially equal to the reference value, the determined subsequent tone burst phase delay being the phase delay of the echo signal with respect to the exciting tone burst; and (g) determining the difference in phase delay between echo signals to determine the relative phase delay of the echo signals.

25. The method according to claim 24 further comprising the step of varying the phase delay and frequency of the subsequent tone burst until the zero-crossings of an edge of each pulse in the series of pulses are substantially aligned with the zero-crossings the particular echo signal.

26. The method according to claim 24 further comprising the steps of:

sampling each echo signal as a function of the phase of that echo signal; and performing a Fast Fourier Transform of the samples of the echo signal to measure nonlinearities that produce harmonics in the particular echo signal.

* * * * *